United States Patent [19]

Kawabe et al.

[11] 3,948,795

[45] Apr. 6, 1976

[54] METHOD OF LOW-TEMPERATURE ACTIVATION OF PEROXIDES

[75] Inventors: Yasumasa Kawabe, Shizuoka; Masaaki Suzuki, Tokyo, both of Japan

[73] Assignee: Tokai Denka Kogyo Kabushiki Kaisha, Tokyo, Japan

[22] Filed: Dec. 21, 1973

[21] Appl. No.: 427,396

[52] U.S. Cl. ............ 252/186; 252/99; 260/556 AR; 260/610 R; 260/610 A; 423/272

[51] Int. Cl.$^2$ ...................... C01B 15/02; C11D 7/54

[58] Field of Search ...... 252/186, 99; 423/272, 273, 423/584; 260/556 AR, 610 R, 610 A

[56] References Cited

UNITED STATES PATENTS

| | | | |
|---|---|---|---|
| 3,183,266 | 5/1965 | Matzner | 252/186 |
| 3,245,913 | 4/1966 | Matzner | 252/186 |
| 3,706,671 | 12/1972 | Hardy | 252/186 |

*Primary Examiner*—Benjamin R. Padgett
*Assistant Examiner*—Irwin Gluck
*Attorney, Agent, or Firm*—Flynn & Frishauf

[57] ABSTRACT

This invention provides a method for activating peroxides, particularly hydrogen peroxide or hydrogen peroxide adducts and for thereby furnishing the said peroxides with excellent bleaching effects, cleaning effects, and sterilizing effects at low temperatures, by adding to the said peroxides an aromatic compound containing in the molecule one or several groups represented by the formula

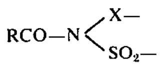

wherein R is a substituted or unsubstituted monovalent aromatic group and X is either CO or $SO_2$. The activation according to this invention is preferably carried out in an aqueous solution at a pH value ranging from 7 to 11, at a temperature below 40°C.

7 Claims, No Drawings

METHOD OF LOW-TEMPERATURE ACTIVATION OF PEROXIDES

BACKGROUND OF THE INVENTION

1. Field of the Invention

This invention relates to a method for furnishing peroxides, particularly hydrogen peroxide or hydrogen-peroxide adducts with excellent bleaching effects, cleaning effects, and sterilizing effects at low temperatures.

2. Description of the Prior Art

Hydrogen peroxides and adducts thereof are widely used as the bleaching agent for fibers and pulps because of their excellent characteristics. This is based upon such characteristics as: they are capable of bleaching all sorts of fibers and pulps without strength loss, that continuous bleaching in a short period of time is feasible by heating, that color reversion after the bleaching is scarce, that they are odorless, that they are inexpensive, and that in bleaching fibers they produce almost no affects upon previously dyed products, fluorescent dyes and resin treatment.

Although hydrogen peroxide and adducts thereof are used in industries without difficulty on the basis of these characteristics, they are notably deficient in that they are low in effect at low temperatures.

The results are that home detergents with a solid hydrogen-peroxide adduct incorporated will not produce marked effects if warm water is not employed and require a very long period of time at a low temperature. Accordingly, in places where cold-water cleaning is usually applied, satisfactory bleaching and cleaning will not be attained in such a manner.

In order to overcome these difficulties a variety of additives, that is, activators have been proposed for carrying out effective bleaching, cleaning and sterilizing with peroxides, for example, sodium perborate at a low temperature.

For example, compounds in which at least two acetyl or propyl groups are attached to a nitrogen atom (Japanese Pat. Publication No. 10,165/63), aromatic and aliphatic mixed carboxylic anhydrides (Japanese Patent Publication No. 9456/69), carboxylic esters of cyanuric acid (Japanese Pat. Publication No. 9455/69), substances releasing formaldehyde or formic esters and amides (Japanese Pat. Publication No. 13,405/67) are mentioned.

Whereas these activators become highly effective if warmed to a certain degree, they are very low in effect at a low temperature and in a short period of time. Therefore, further improvement is desirable.

SUMMARY OF THE INVENTION

It is an object of this invention to provide activators for enhancing bleaching effects, cleaning effects and sterilizing effects of peroxides, particularly hydrogen peroxide or hydrogen-peroxide adducts when used in aqueous solution at low temperatures.

DESCRIPTION OF THE INVENTION

We have found that suitable activators answering the object of this invention are aromatic compounds having a group represented by the following formula (I):

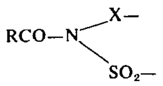

(I)

In the formula (I) R represents a substituted or unsubstituted monovalent aromatic group and X represents CO or $SO_2$.

Among the aromatic compounds represented by the formula (I) preferable group of compounds are those represented by the following general formula (II):

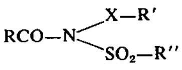

(II)

In the formula (II) R is a substituted or unsubstituted monovalent aromatic group, and R′ and R″ are substituted or unsubstituted monovalent aromatic groups, or

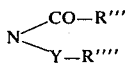

(R‴ and R⁗ are substituted or unsubstituted monovalent aromatic groups and Y is CO or $SO_2$.)

R′ and R″ are different or the same, but when combined with each other they may form a divalent aromatic group, and X represents CO or $SO_2$.

Among the aromatic compounds represented by the formula (II) a particularly preferable group of compounds are those having a structure of the following formula (III):

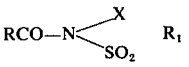

(III)

In the formula (III) R is a substituted or unsubstituted monovalent aromatic group and $R_1$ represents a substituted or unsubstituted divalent aromatic group.

The substituted or unsubstituted monovalent aromatic groups shown by R and R‴ in the formulae (II) and (III) mean a phenyl group or phenyl groups a part of the hydrogens of which is substituted with nitro, amino, chlorine, bromine, fluorine, sulfone and/or hydroxyl; and the substituted or unsubstituted monovalent aromatic groups among the groups shown by R′, R″ and R⁗ include, in addition to the groups shown by R and R‴, a naphthyl group or naphthyl groups a part of the hydrogens of which is substituted with nitro, amino, chlorine, bromine, fluorine, sulfone and/or hydroxyl. $R_1$ represents a substituted or unsubstituted phenylene or naphthylene group.

Among the group of compounds represented by the formula (II) illustrated below are the following preferred embodiments:

N,N-Diacyl aromatic sulfonamides; for example, N,N-dibenzoyl benzenesulfonamide, N,N-di-p-chlorobenzoyl benzenesulfonamide, N,N-di-p-nitrobenzoyl benzenesulfonamide, N,N-dibenzoyl naphthylsulfonamide.

N-Acyl di-aromatic sulfonamides, for example, N-benzoyl dibenzenesulfonamide.

N,N,N′,N′-Tetracyl sulfamides; for example, N,N,N′,N′-tetrabenzoyl sulfamide.

N,N′-Diacyl-N,N′-di-aromatic sulfonylureas; for example, N,N′-dibenzoyl N,N′-dibenzenesulfonylurea.

Pentacyl imidodisulfamides; for example, pentabenzoyl imidodisulfamide.

N-Acyl O-sulfobenzimides (N-acyl saccharins); foexample, N-benzoyl saccharin, N-p-chlorobenzoyl saccharin, N-p-nitrobenzoyl saccharin.

N-Acyl O-sulfonaphthoylimides; for example, N-benzoyl O-sulfonaphthoylimide, N-p-chlorobenzoyl O-sulfonaphthoylimide, N-p-nitrobenzoyl O-sulfonaphthoylimide.

Among the compounds illustrated below are particularly preferred compounds having the structure of formula (III):

N-Benzoyl saccharin, N-p-chlorobenzoyl saccharin, N-p-nitrobenzoyl saccharin, N-benzoyl O-sulfonaphthoylimide, N-p-chlorobenzoyl O-sulfonaphthoylimide, N-p-nitrobenzoyl O-sulfonaphthoylimide.

It is in the light of effects at low temperature which is aimed at in the present invention that the compounds having the group shown by the formula (I) are limited to aromatic compounds.

For example, the compounds wherein, as the R represented by the formula (I), the aromatic group according to the invention is replaced by an aliphatic group will be extremely low in the effect activating peroxides at low temperatures.

Furthermore, the activators containing an aromatic sulfonylimide group such as those of the formulae (II) and (III) possess preferable properties especially in sterilizing effect.

Peroxides to which the present invention is applicable are hydrogen peroxide and hydrogen-peroxide adducts such as sodium perborate, sodium percarbonate, sodium perpyrophosphate and urea peroxide.

Ratio of addition of the peroxide and activator is desirably fixed in such a way that an activator corresponding in quantity to one aromatic group of R and R''' in the formulae (II) and (III) per mole of active oxygen is added. As a matter of fact, it is desirable that the amount of activator to be added per mole of active oxygen is, for example, 1 mole with N,N-diacyl aromatic sulfonamides, N-acyl O-sulfobenzimides and the like and 0.5 mole with N,N'-diacyl N,N'-di-aromatic sulfonylureas, N,N,N',N'-tetracyl sulfamides and the like.

However, addition of a larger amount of the activator will further confirm utilization of the peroxide, whereas the effect can be controlled by decreasing the added amount of the activator.

In carrying out bleaching, cleaning and sterilization there is a close relationship between pH of the bleaching bath and the effect of the activator. It is preferably with respect to the effect of the activator to maintain pH of the bath within the range from 7 to 11 and more preferable to maintain the pH between 8 and 10. Although it is allowable to use a pH below 7 or above 11, the effect is remarkable at a range from 7 to 11, especially from 8 to 10. As pH of the bleaching bath containing the activator and peroxide is reduced with elapse of time, it is desirable in order to maintain the optimum pH range as mentioned above to add a buffering agent. As the buffering agent are employed phosphates, silicates, carbonates, borates, acetates, nitrilotriacetate and the like.

This invention can be realized by the addition of the above-mentioned peroxide and activator, but addition thereto of the aforementioned buffering agent will be more effective and, in addition, other components of the detergent such as a surface active agent, antiprecipitant and the like and bleaching assistants may also be added.

Addition of the peroxide and activator in an amount sufficient to produce the desired bleaching effect and further of the buffering agent for maintaining the above-cited pH thereby obtaining a satisfactory result is advisable.

In the treatment of fibers below 40°C and within 20 minutes there is produced almost no effect of peroxide if it is added alone. Further addition of an activator of the prior art in addition to the peroxide will not be satisfactory though there will then be produced some bleaching, cleaning and sterilizing effects. However, addition of the activator according to the invention, a peroxide and desirably a buffering agent is remarkably effective even at such a low temperature and in such a short period of time as set forth above.

At a higher temperature, in this case, the maximum effect is obtained in a shorter period of time. The process of the invention, therefore, can be applied in cases at temperatures above 40°C. However, remarkable results produced by the process at such low temperatures as below 40°C are particularly noted.

Although the process of this invention is applicable to any case where a peroxide is to be effective at a low temperature below 40°C, it is distinctively characterized especially for fibers by the fact that it can be conveniently used at a low temperature without influence upon the fiber strength, dye, fluorescent dye and resin treatment.

In producing solid cleaning mixtures it is desirable in order to prevent ageing during storage to avoid making contact between the solid peroxide and the activator before use as well as to keep the two in dry state.

To put this concretely, not to mention incorporation of each component after it is dried, either of the two methods, incorporation of the activator in a form coated with a water-soluble or -dispersable coating agent and separate packaging of the two may be adopted.

The solid cleaning mixtures mean the material for use as home or industrial detergent, presoaking agent, bleaching agent, or sterilizer.

On the other hand, when a liquid peroxide, for example, is used, it is naturally necessary to incorporate it upon use and similar consideration is needed regarding the activator.

DESCRIPTION OF THE PREFERRED EMBODIMENT

The invention will be described in more detail by the examples below but it goes without saying that the invention is not limited to these examples.

Example 1.

Bleaching and stain removal tests were made using two sorts of cotton cloth, semi-bleached cotton cloth (Hunter whiteness 73.3) and stained cloth (Hunter whiteness 54.0) obtained by staining the semi-bleached cotton cloth with coffee and thoroughly washing with water.

The test conditions were: A liquor ratio (ratio of the cotton cloth to the bleaching liquid) of 1:25; sodium dodecylbenzenesulfonate 1.25%, sodium polyphosphate 2.0%, sodium metasilicate 0.25% and nonionic surface active agent 0.125% on the basis of the weight of each cotton cloth; to the mixture was added sodium perborate in such a manner that the concentration of active oxygen was 30 mg/liter (corresponding to 0.72% of sodium perborate on the basis of the weight of cotton cloth) and, in addition, an activator was added in the most preferable ratio in terms of the sodium perborate as shown in the table; the test was made for 20 min. while maintaining the aqueous solution at 30°C and with efficient stirring. The results are shown in Table 1 (Reference example for the comparison with the invention) and Table 2 (Example of the invention).

Table 1

| | Activator mole/Sodium perborate, mole | Semi-bleached cloth Whiteness | Semi-bleached cloth Whiteness rise | Stained cloth White-ness | Stained cloth White-ness rise |
|---|---|---|---|---|---|
| Neither sodium perborate nor activator | — | 73.4 | 0.1 | 54.3 | 0.3 |
| No activator | — | 73.8 | 0.5 | 54.7 | 0.7 |
| Acetic anhydride used as activator | 1 | 74.8 | 1.5 | 57.0 | 3.0 |
| Triacrylcyanuric acid used as activator | 0.5 | 74.9 | 1.6 | 57.6 | 3.6 |
| N-Acetylsaccharin used as activator | 1 | 75.3 | 2.0 | 57.8 | 3.8 |

Table 2

| | Activator, mole/Sodium perborate, mole | Semi-bleached cloth Whiteness | Semi-bleached cloth Whiteness rise | Stained cloth White-ness | Stained cloth White-ness rise |
|---|---|---|---|---|---|
| N-Benzoylsaccharin used as activator | 1 | 79.1 | 5.8 | 63.9 | 9.7 |
| N,N-Dibenzoylbenzenesulfonamide used as activator | 1 | 77.4 | 4.1 | 61.1 | 7.1 |
| N,N,N'-N'-Tetrabenzoylsulfamide used as activator | 0.5 | 77.1 | 3.8 | 60.8 | 6.8 |

Comparison of the results in Table 1 with the data for comparison in Table 2 demonstrates that the process according to this invention is excellent in bleaching effect as well as in cleaning effect.

Example 2.

Tests were made using hydrogen peroxide in place of sodium perborate in an amount corresponding to the same amount of active oxygen [the hydrogen peroxide (100%) added being 0.16% on the basis of the weight of cotton cloth]. The results are shown in Table 3 (Reference example not according to the invention) and Table 4 (Example of the invention).

Table 3

| | Activator, mole/Hydrogen peroxide, mole | Semi-bleached cloth Whiteness | Semi-bleached cloth Whiteness rise | Stained cloth White-ness | Stained cloth White-ness rise |
|---|---|---|---|---|---|
| Neither hydrogen peroxide nor activator | — | 73.4 | 0.1 | 54.3 | 0.3 |
| No activator | — | 73.7 | 0.4 | 54.7 | 0.7 |

Table 4

| | Activator, mole/Hydrogen peroxide, mole | Semi-bleached cloth Whiteness | Semi-bleached cloth Whiteness rise | Stained cloth White-ness | Stained cloth White-ness rise |
|---|---|---|---|---|---|
| N-Benzoylsaccharin used as activator | 1 | 78.9 | 5.6 | 63.5 | 9.5 |
| N,N-Dibenzoylbenzenesulfonamide used as activator | 1 | 77.5 | 4.2 | 61.4 | 7.4 |

Example 3.

Tests were made by the same method as in Example 1 on pH reduction by decrease in the added amount of sodium tripolyphosphate which was used in a proportion of 2% in Example 1. The results are shown in Table 5.

N-Benzoyl saccharin was used as the activator.

Table 5

| Added amount of sodium tri-polyphosphate | pH in bleaching On ini-tiation | pH in bleaching On com-pletion | Semi-bleached cloth Whiteness | Semi-bleached cloth Whiteness rise | Stained cloth White-ness | Stained cloth White-ness rise |
|---|---|---|---|---|---|---|
| 2.0% | 8.80 | 8.53 | 79.1 | 5.8 | 63.7 | 9.7 |
| 1.5% | 8.48 | 7.80 | 78.1 | 4.8 | 61.1 | 7.1 |
| 1.0% | 8.02 | 7.33 | 77.4 | 4.1 | 59.8 | 5.8 |

As obviously shown in Table 5, a more marked effect is obtained at a pH in bleaching higher than 8.

We claim:

1. Method of low-temperature activation of hydrogen peroxide or a hydrogen peroxide adduct, which comprises adding to said peroxide an activator comprising an aromatic compound

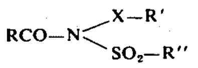

wherein R is a substituted or an unsubstituted monovalent aromatic group; R' and R'' are each either a substituted or an unsubstituted monovalent aromatic group or

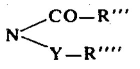

wherein R''' and R'''' are each a substituted or an unsubstituted monovalent aromatic group and Y is either CO or $SO_2$, R' and R'' being different or the same and may form a divalent aromatic group when combined with each other, and X is either CO or $SO_2$.

2. Method according to claim 1, wherein the activator is an aromatic compound having the formula

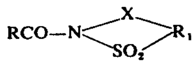

wherein R is a substituted or an unsubstituted monovalent aromatic group and $R_1$ is a substituted or an unsubstituted divalent aromatic group.

3. Method according to claim 1, wherein R in the formula is either a phenyl group or a substituted phenyl group wherein a part of the hydrogen atoms has been substituted by a nitro, amino, chlorine, bromine, fluorine, sulfone or hydroxyl group, and R' and R'' in the formula are each selected from the group consisting of a phenyl group, said substituted phenyl group, a naphthyl group and a substituted naphthyl group wherein a part of the hydrogen atoms has been substituted by a nitro, amino, chlorine, bromine, fluorine, sulfone or hydroxyl group.

4. Method according to claim 1, wherein R and R''' in the formulae are each either a phenyl group or a substituted phenyl group wherein a part of the hydrogen atoms has been substituted by a nitro, amino, chlorine, bromine, fluorine, sulfone or hydroxyl group, and R'''' in the formula is selected from the group consisting of a phenyl group, said substituted phenyl group, a naphthyl group and a substituted naphthyl group wherein a part of the hydrogen atoms has been substituted by a nitro, amino, chlorine, bromine, fluorine, sulfone or hydroxyl group.

5. Method according to claim 2 wherein R in the formula is either a phenyl group or a substituted phenyl group wherein a part of the hydrogen atoms has been substituted by a nitro, amino, chlorine, bromine, fluorine, sulfone or hydroxyl group, and $R_1$ in the formula is a substituted or an unsubstituted phenylene or naphthylene group.

6. Method according to claim 1 wherein the peroxide is a member selected from the group consisting of hydrogen peroxide, sodium perborate, sodium percarbonate, sodium perpyrophosphate, and urea peroxide.

7. Method according to claim 1 wherein the activation is carried out in an aqueous solution at a pH value ranging from 7 to 11, and at a temperature below 40°C.

* * * * *

UNITED STATES PATENT AND TRADEMARK OFFICE

CERTIFICATE OF CORRECTION

PATENT NO. : 3,948,795

DATED : April 6, 1976

INVENTOR(S) : YASUMASA KAWABE et al

It is certified that error appears in the above-identified patent and that said Letters Patent are hereby corrected as shown below:

Column 2, lines 35-39: replace "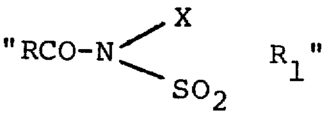"

with --- 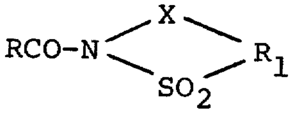 ---.

Signed and Sealed this

Twenty-second Day of March 1977

[SEAL]

Attest:

RUTH C. MASON
*Attesting Officer*

C. MARSHALL DANN
*Commissioner of Patents and Trademarks*